F. RADECHOVSKY.
BUNDLE TIER.
APPLICATION FILED JULY 13, 1920.

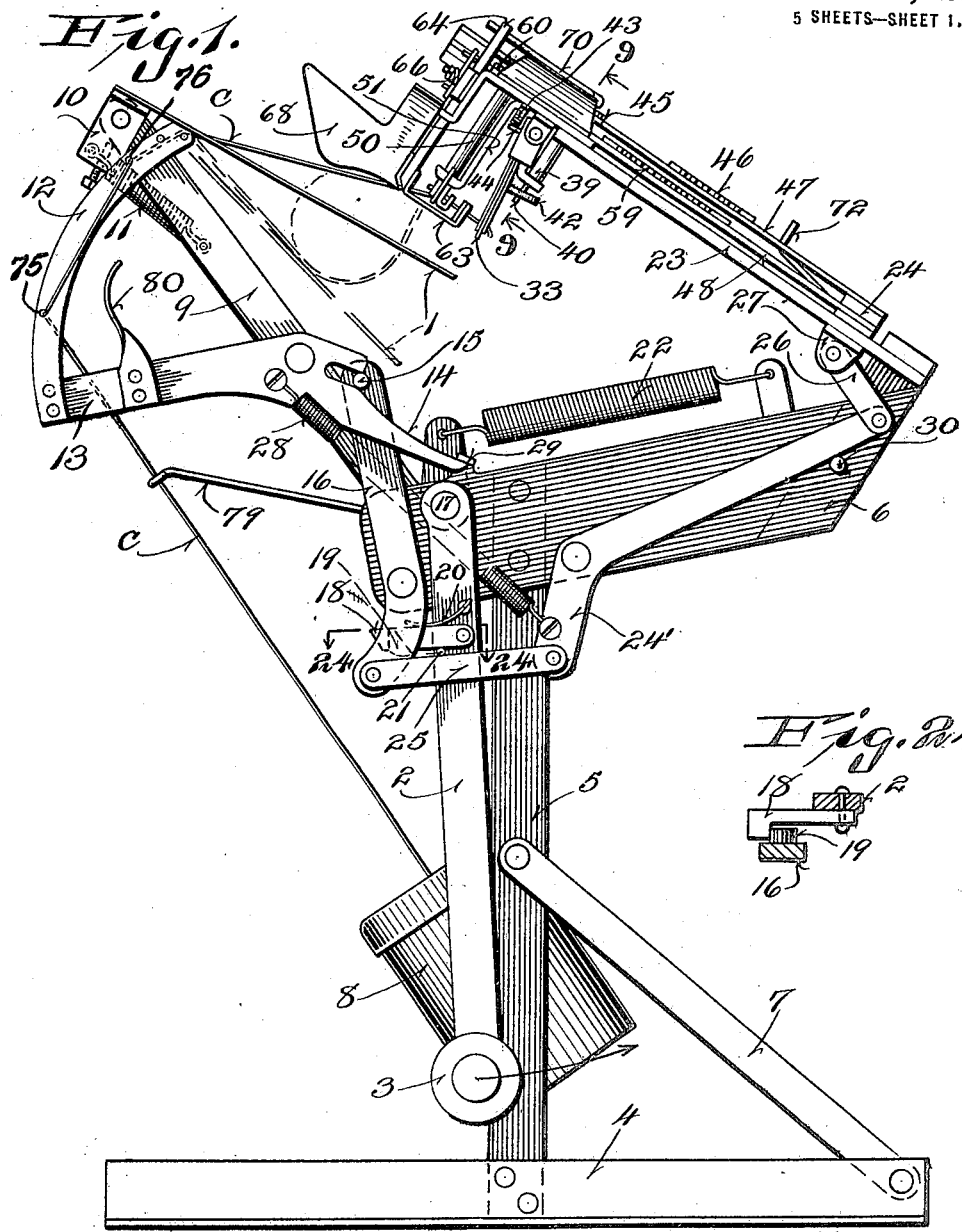

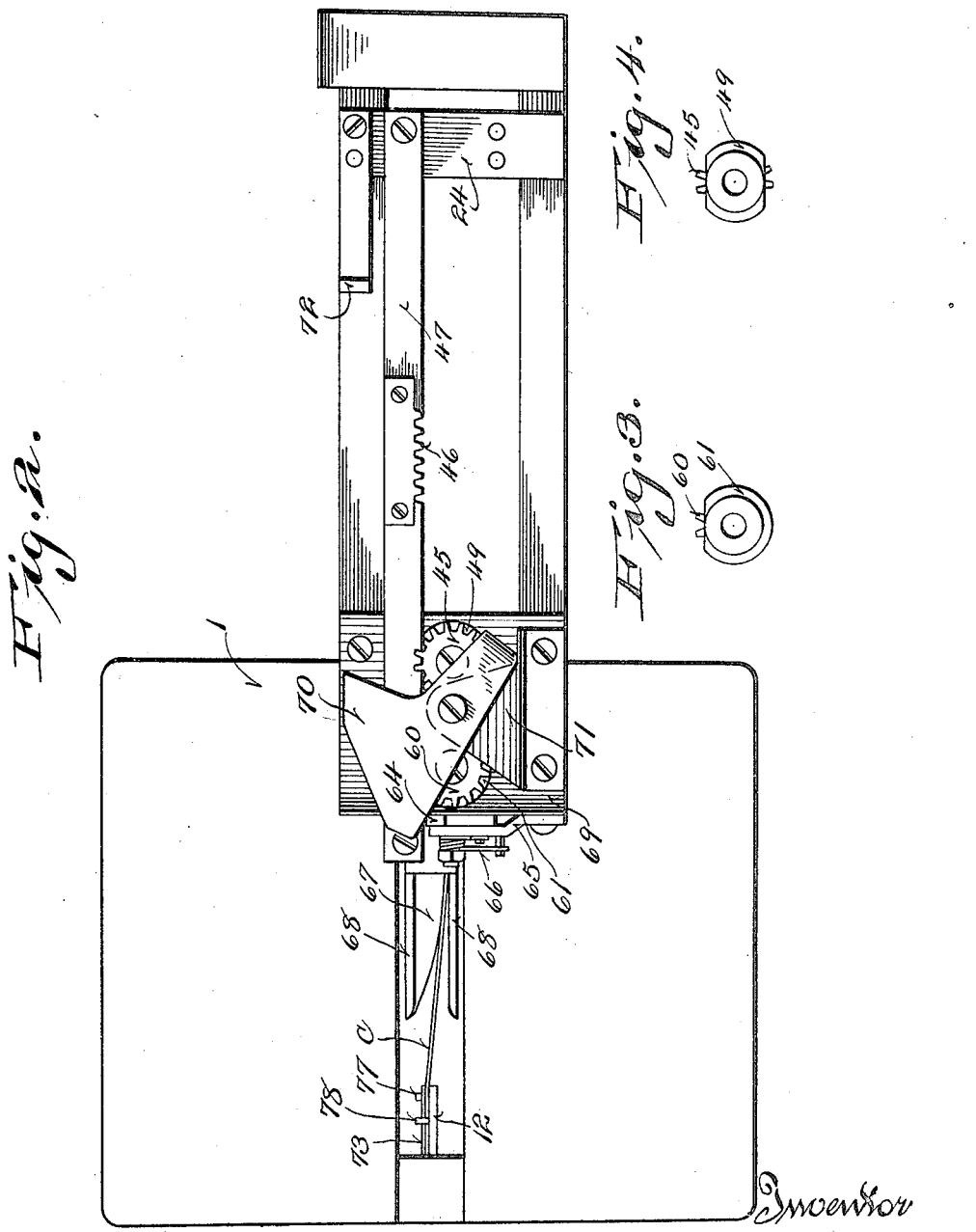

1,407,481.

Patented Feb. 21, 1922.
5 SHEETS—SHEET 3.

Inventor
Frank Radechovsky

Witness
T. F. Britt

Young & Young
Attorneys

F. RADECHOVSKY.
BUNDLE TIER.
APPLICATION FILED JULY 13, 1920.
1,407,481.
Patented Feb. 21, 1922.
5 SHEETS—SHEET 4.
Fig. 9.
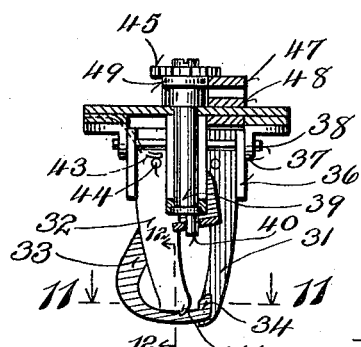
Fig. 10.
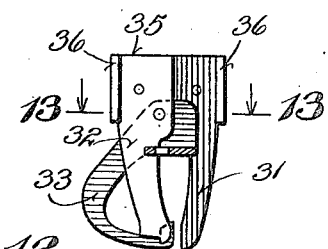
Fig. 11.
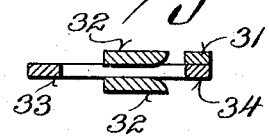
Fig. 12.
Fig. 13.
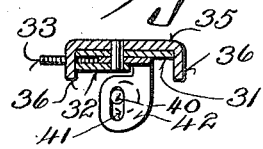
Fig. 14.
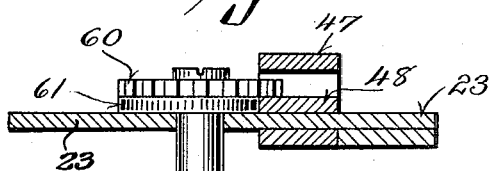
Fig. 15.
Fig. 16.
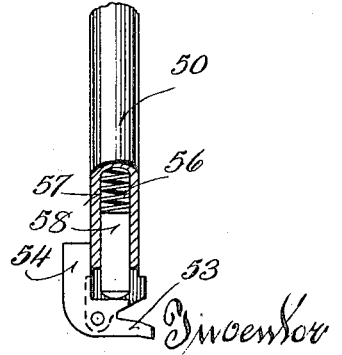
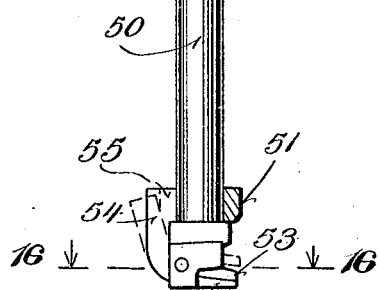
Inventor
Frank Radechovsky
By Young & Young
Attorneys
Witness
T. P. Brett

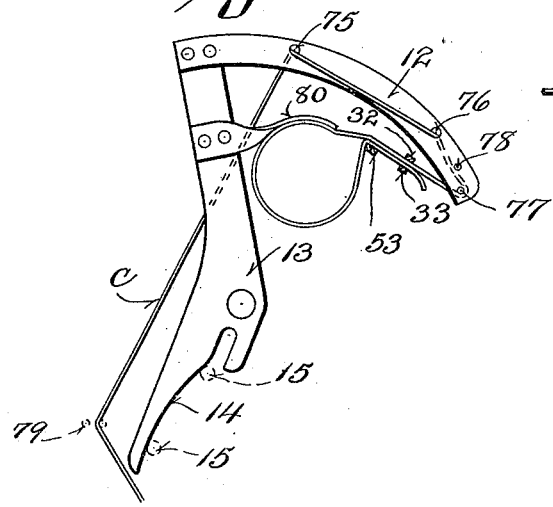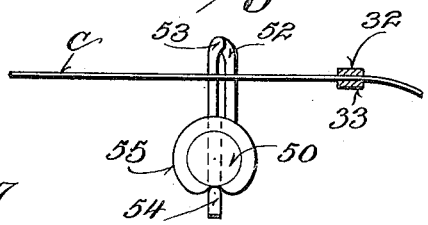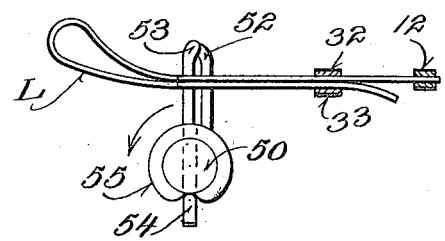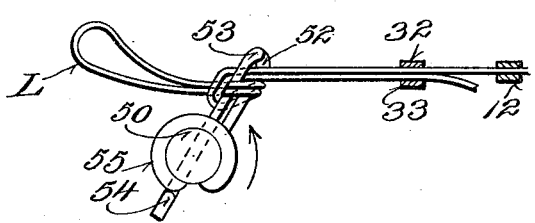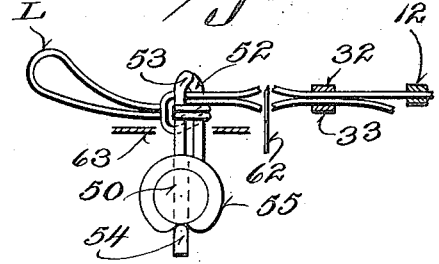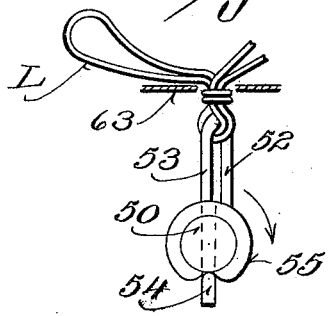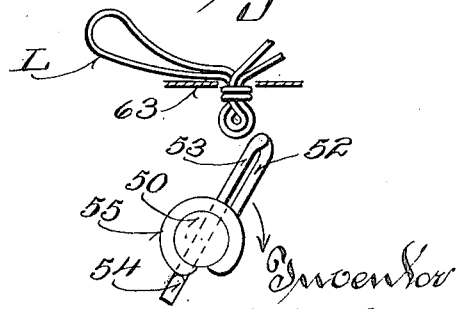

UNITED STATES PATENT OFFICE.

FRANK RADECHOVSKY, OF MILWAUKEE, WISCONSIN, ASSIGNOR OF ONE-HALF TO FRED E. LINS, OF MILWAUKEE, WISCONSIN.

BUNDLE TIER.

1,407,481.          Specification of Letters Patent.      Patented Feb. 21, 1922.

Application filed July 13, 1920. Serial No. 395,819.

*To all whom it may concern:*

Be it known that I, FRANK RADECHOVSKY, a citizen of the United States, and resident of Milwaukee, in the county of Milwaukee and State of Wisconsin, have invented certain new and useful Improvements in Bundle Tiers; and he hereby declares that the following is a full, clear, and exact description thereof.

My invention pertains to new and useful improvements in semi-automatic machines for tying bundles, and has special reference to means for tying bunches of vegetables, such as radishes, onions and the like.

Heretofore it has been generally customary to bunch radishes and similar vegetables by hand, which is obviously a comparatively slow process, especially when each individual bunch must be separately tied. Consequently it is the primary object of this invention to provide a simply constructed tying machine by means of which bunches of vegetables can be rapidly and effectively tied.

An additional object of this invention is to provide a machine of this character of a semi-automatic nature which can be readily actuated when necessary by one foot of the operator so as to leave the hands free for feeding bunches of vegetables to the tying mechanism.

It is also an object of this invention to provide a simply constructed machine, the large majority of the parts of which may be made of sheet metal stampings which can be readily assembled to construct a relatively inexpensive tying means.

It is likewise an object of this invention to provide a novel and simply constructed cord holding device for the needle portion of the machine whereby the cord is always retained taut.

With these general objects in view and others which will become evident as the description proceeds, the invention resides in the novel features of construction, combination and arrangement of parts which will be hereinafter more particularly described and claimed.

In the accompanying drawings:

Figure 1 represents a side elevational view of a machine constructed in accordance with my invention.

Figure 2 is a plan view of the upper portion of the machine.

Figures 3 and 4 are detailed bottom plan views of the gears which are used on the knotting shaft and eccentric shaft respectively.

Figure 9 is a transverse section taken on the plane of the line 9—9 of Figure 1.

Figure 10 is a detailed elevational view of the cord retaining fingers and their supporting frame.

Figure 11 is a horizontal section through the cord retaining fingers and taken on the plane of the line 11—11 of Figure 9.

Figure 12 is a vertical section through the same parts on the plane of the line 12—12 of Figure 9.

Figure 13 is a sectional view on the plane of the line 13—13 of Figure 10.

Figure 14 is a longitudinal section on the plane of the axes of the knotting shaft.

Figure 15 is a similar view through the lower end portion of the knotter.

Figure 16 is a transverse section taken on the plane of the line 16—16 of Figure 14.

Figure 17 is an elevational view of the needle and its supporting means showing the relation of the different portions of the tying cord just prior to the formation of a knot in the loop which has been disposed about the bunch of articles being tied.

Figures 18 to 23 are detail diagrammatic views showing the several actions of the knotter in tying the cord.

Figure 24 is a substantially horizontal sectional view on the plane of the line 24—24 of Figure 1.

Figure 5:
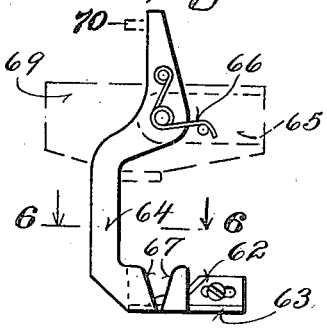
Figure 5 is a front elevational view of the stripper arm.
Figure 6:
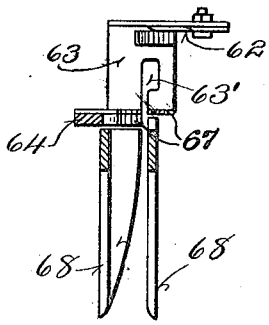
Figure 6 is a substantially horizontal section taken approximately on the plane of the line 6—6 of Figure 5, showing the stripper plate and a portion of the cord guide and also a portion of the stationary guide arms leading thereto.

Referring more particularly to the drawings, it will be seen, especially from Figure 1, that my improved machine is of a relatively compact design and all of the various operating parts are within the easy reach of the operator who stands or is seated in front of the machine in position to feed bunches of vegetables or other articles to be tied on to the work table 1, and to move the actuating foot lever 2, the same having a pedal 3 at its lower or free end. These parts and other operating mechanisms of the machine are carried upon the support which comprises a base 4, a substantially vertical standard 5, and a laterally support arm 6. The standard 5 is braced by a brace bar 7 and carries a cord receptacle 8 in which a ball of twine or the like may be housed and from which the tying cord may be fed. The major portion of the support arm 6 extends rearwardly, and that part which projects forwardly of the standard 5 has a table carrying arm 9 fixed thereto, the same extending upwardly and forwardly in an inclined position and having a work table bracket 10 pivoted thereto. Normally the work table, which is in the form of a pair of spaced sheet metal plates, is raised, but as soon as the articles to be tied are placed thereon it is depressed to the dotted line position shown in Figure. 1. A contractile spring 11 holds the table in its normal elevated position.

A needle 12 in the form of an arcuate bar works between the plates forming the work table and is mounted on one end of a needle lever arm 13, this arm being pivoted intermediate its end of the table carrying arm 9. The end portion of the needle lever arm opposite the end to which the needle 12 is secured has an arcuate pin engaging track 14 over which a pin 15 on a needle operating lever 16 is slid. This lever 16 is pivoted intermediate its ends on the support arm 6, and its fulcrum point is relatively adjacent, although below the pivot 17 of the actuating foot lever 13.

The levers 2 and 16 are normally connected together for simultaneous movement, but are automatically releasable after the foot lever 2 has been moved a predetermined extent. For instance the lever 2 has a latch 18 pivoted thereto, one end of which is engageable with cam shaped latch lug 19 on the lever 16. A spring 20 normally retains the latch in engagement with the lug, and the pin 21 on the lever 2 prevents the latch 18 from dropping below a predetermined operative point. Thus after the lever 2 has been moved a predetermined distance in the direction of the arrow in Figure 1, the latch 18 will ride off of the lug 19 to disconnect said levers. Upon release of the foot pedal 2 a contractile spring 22 retracts the same to normal position.

Disposed at the opposite end of the support arm 6 from the table carrying arm 9 and extended in substantially the same direction is the stationary rack table 23, which table provides a support for the tying mechanism and a guide track for the rack carriage 24. The latter is shifted longitudinally of the table 23 simultaneously with the movement of the levers 2 and 16 and the operation of the needle lever arm 13. In other words a rack carriage lever 24' is pivoted intermediate its ends to the support arm 6, and has its lower end connected by a link 25 with the similar lower end of the needle operating lever 16, its other end having a link connection 26 with an ear 27 depending from said rack carriage 24. A retracting spring 28 connected with the needle lever arm 13, and with the rack carrier arm 24, returns both these elements to normal inactive position at the end of the operation of the machine, the needle lever arm 13 being limited in its retracting movement by a stop 29, while the lever 24' is similarly affected by a stop 30, one of the mechanisms carried on the table 23 is a cord retaining means for holding the free end of the cord C while the portion adjacent said ends is being tied about the bundle. As shown in the detailed views, Figures 9 to 13 inclusive, this means comprises a stationary guide finger 31 and a pair of slightly spaced stationary cord retaining fingers 32, said fingers having a pivoted cooperating cord retaining finger 33 movable therebetween and toward and away from the guide finger 31. In other words, the pair of stationary fingers 32 and the guide finger 31 are spaced apart to permit the end of the needle 12 to enter therebetween and to dispose the end portion of the cord C on the pivoted retaining finger 33 adjacent the hooked end 34 thereof. The pivoted finger 33 is fulcrumed at its upper end between the upper end portions of the fingers 32, and these stationary fingers 32 together with the guide 31 are fixed in a frame 35. The laterally extending spaced flanges 36 which form a part of this frame 35 provide pivot ears for cooperation with similar ears 37 on the table 23, the pivot rod 38 extending through all of these ears whereby the frame 35 and the parts carried thereby can rock forwardly and rearwardly with respect to said table 23 and thus move the active ends of the cord retaining fingers toward and away from the knotting mechanism to be hereinafter more particularly described.

Proper rocking of the pivoted cord retaining finger 33 is obtained through the rotation of the eccentric shaft 39, same being journaled in suitable bearings on the table 23 and having an eccentric 40 on its lower end, the pin of which is movable in the slot 41 of a rocking plate 42; the latter extends from and forms a part of the pivoted finger 33. Upon rotation of the shaft 39, the finger 33 will be obviously rocked back and forth on its pivot, and the frame 35 will likewise be given a pendulous movement in the plane at right angles to the plane of movement to the former and against the tension of a spring 43. As shown in Figures 1 and 9 the spring 43 acts on the pin 44 projected from frame 35.

A gear 45 is fixed to the upper end of the eccentric shaft 39 above the table 23 and is adapted to have a rack 46 intermittently engaged therewith, this rack being carried by an upper rack bar 47. The hereinbefore mentioned rack carriage 24 has this rack bar 47 mounted thereon as well as the lower rack bar 48. The rack bar 47 is effectively guided during its reciprocation, and especially during the time when the rack 46 is out of engagement with the gear 45, being operatively engaged between one edge of said bar 47 and the periphery of a guide collar 49.

The knotted mechanism mounted on the forward end of the table 23 is carried by the lower end of the knotting shaft 50, said end of the shaft being journaled in a bearing on the free end of a bracket arm 51, whereas the upper end is rotatively mounted in a bearing opening in the table 23. The knotter consists of a stationary knotting finger 52 and a pivoted knotting finger 53, this latter finger having an upwardly extending rocking arm 54 which is engageable with the periphery of a cam 55 formed on the lower end of said bracket arm 51. The cam 55 being stationary and the shaft 50 rotatable, it is obvious at predetermined intervals that the ends of the normally engaged knotting fingers 52 and 53 are spaced apart to permit a portion of the cord C to enter therebetween (see Figures 20 and 21). When the cam 55 does not hold the knotting fingers spaced apart, they are held tightly together by the tension of a spring 56, which is located in a bore 57 in the lower end of the shaft 50 and bears against a plunger 58. The latter in turn contacts with a portion of the pivoted finger 53 as indicated most clearly in Figure 15.

As in the case of the eccentric shaft 39, the knotting shaft 50 is rotated intermittently by the reciprocation of the rack carriage 24 and the lower rack bar 48. This bar 48 has a rack 59 of predetermined length fixed thereon for intermittent engagement with a gear 60 on the shaft 50. Fixed to the gear 60 and forming a part thereof is a collar 61, the periphery of which is engageable by one edge of the rack bar 48 for the same purpose as the conduct between the rack bar 47 and the collar 49. The table 23 likewise carries a cutting mechanism for severing the cord C and in proper time, and the knife element 62 of this means is disposed on one end of the stripper plate 63, this part in turn being carried by an intermediate stripper arm 64. As indicated in Figure 5 this stripper arm 64 is fulcrumed to a supporting plate 65 forming one portion of the table 23 and is normally urged to one position by a spring 66. The cord being fed across the stripper 63 is guided into the opening 63' thereof by guide surfaces 67 formed thereon, stationary guide arms 68 further aiding in this respect. As shown in Figures 1 and 2 these guide arms 68 are secured to a bracket 69 and extended forwardly of the free end of the table 23 and over the space between the plates forming the table 1. The stripper plate 63 together with the knife 62 which is mounted thereon is shifted at the proper time by the movement of a rocker 70 against the upper free end of the stripper arm 64, this portion of the arm being extended above the table 23. The rocker 70 is pivoted on the bracket 71 and is intermittently actuated by the engagement of the rocker trip 72 therewith. As shown in Figure 2 the rocker trip 72 is adapted to be contacted with the rocker 70 when the carriage 24 is shifted forwardly on the table 23.

Figure 7:
Figure 7 is an edge of the needle and the cord tensioning device thereof.
Figure 8:
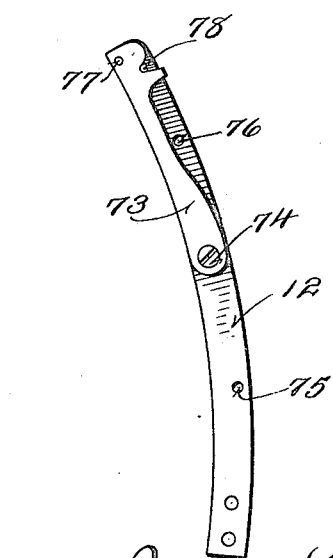
Figure 8 is a side view of the same parts.

The cord tensioning device of the needle 12 consists of a curved spring plate 73 adjustably secured at one end to the needle 12 by the screw 74. The other end of the plate 73 is free and bears against the free end of the needle as shown in Figures 7 and 8. Thus the cord C can be fed through an eye 75 adjacent the base of the needle and through the second eye 76 relatively close to the free end of said needle, after which it is run beneath the free end of the spring plate 73 and between the pins 77 and 78 extending laterally from the needle and through the same. Between the receptacle 8 and the needle 12 the cord is led through a twine guide 79 as shown in Figure 1.

In the operation of my invention the person working the same stands or is seated in front of the machine as hereinbefore mentioned. After the needle is threaded as above described, the operator moves the actuating foot lever rearwardly, which action will rock the needle lever arm 13 and cause the needle 12 to be projected between the guides 68, over the guide surfaces 67 and between the guide finger 31 and the cord retaining fingers 32 when the movable finger 33 is positioned as shown in Figure 9. At this time finger 33 is shifted to the position shown in Figure 10, whereupon the cord will be caught between the hooked end 34 of the same and the coacting surface of the stationary fingers 33 (see Figure 12). Upon the gripping of the free end portion of the cord in this manner further movement of the lever 2 will cause the release of the latch 18 from the lug 19 and permit the simultaneous return of the carriage 24 and the needle 12, and likewise the retraction of the carriage again shifts the pivoted finger 33 to the normal position as indicated in Figures 9 and 11. The end of the cord, however, is still retained by the fingers 32 and 33 and is prevented from lateral movement with the finger 33 by the engagement with lugs 34' on the fingers 32. Thus the cord C after this initial manipulation of the lever 2 will be disposed as shown in full on the plane of the line in Figure 1.

The operator then takes a bunch of vegetables to be tied and forces the same below the guides 68 and between these parts and the work table 1, the latter being depressed as indicated by the broken lines in the last mentioned figure. The cord will be likewise depressed and engaged with a portion of the bunch which is being tied so that when the lever 2 is again operated to throw the needle 12 towards the rear of the machine as hereinbefore mentioned and as shown in Figure 17, the bunch will be completely encircled by the cord. Inasmuch as the cord is again brought into close proximity to the retaining fingers 32 and 33 it will be caught and gripped as was the free end portion thereof. By reference to Figure 17, the exact manner of positioning and circling the cord about the bundle may be seen, this view showing the holding of the free end of the cord and the intermediate portion thereof by the fingers 32 and 33, while the portions of the cord there adjacent are disposed over the knotting fingers. Just prior to the second engagement of the cord by the retaining fingers 32 and 33 the uppermost section of the cord is pressed against the bundle and held securely by plunger engaging arm 80.

Figures 18 to 23 illustrate the several operations of the portions of the machine which are directly responsible for the formation of a bunch loop "L." For instance Figure 18 shows a single strand of cord held by the jaws of the retaining fingers 32 and 33 and trained over the knotting fingers 52 and 53. On the second manipulation of the needle 12 two strands of cord will be held by fingers 32 and 33 and trained over the knotting fingers 52 and 53 as shown in Figure 19. As the movement of the carriage 24 causes the rotation of the shaft 50 in a counter clock wise direction, the knotting fingers 52 and 53 will be similarly turned as shown by the arrows in Figures 19 and 20, and simultaneously opened by the cam 55 so that on the completion of one revolution of said shaft the double strands of cord will be wrapped about the knotting fingers as indicated in Figure 20. In other words, one part of the double strand will be disposed around such fingers and another part will be gripped between the fingers.

The movement of the carriage 24 will likewise operate the cutter 62 and the stripper plate 63, these parts being brought into operation subsequently by the completion of one revolution of the shaft 50 in the counter clockwise direction. That is, upon working of the stripper arm 64, the knife 62 will be projected as indicated in Figure 21 and the stripper plate will move as in Figure 22 so as to pull that portion of the double strand of cord held between the knotting fingers through the other loop of the double strand which is disposed around said fingers and thus complete the knot. All of these operations are carried out during the projection of the carriage 24 forwardly on the table 23. On the automatic return movement of said carriage due to the disengagement of the latch 18 from its lug 19 all of the parts actuated by the shifting of the carriage will be returned to normal inactive positions. In this manner the knotting shaft 50 is revolved in the clockwise direction and the knotting fingers spaced apart to disengage the knot which has been formed on the loop L. (See Figure 23). Obviously immediately after the return of the parts to positions of rest, a second bunch of vegetables or the like can be similarly tied upon being placed on the work table 1 and the actuating foot lever moved by the operator.

I claim:

1. In a machine of the class described, a support, a table carrying arm extended from the support, a work table pivoted on the arm, a cord tying mechanism, means urging said table about its pivot toward said tying mechanism, means movable through the table to dispose a cord around an article on the table, and feed the same by the tying mechanism, and means for operating the tying mechanism.

2. In a machine of the class described, a support, a table carrying arm extended from the support, a movable work table on the arm, an article holding member, means urging the table towards the member, a tying mechanism, means for disposing a cord around an article on the table and feeding the same to the tying mechanism and means for operating the tying mechanism.

3. In a machine of the class described, a support, a table carrying arm extended from the support, a work table pivoted on the arm, an article holding member, means urging the table toward the member, a tying mechanism, means for disposing a cord around an article on the table and feeding the same to the tying mechanism irrespective of the location of said work table and means for operating the tying mechanism.

4. In a machine of the class described, a support, a table carrying arm, extended from the support, a movable work table on the arm, means for mechanically disposing a cord around an article on the table, means for knotting the cord around the article, means for yieldingly urging said table toward the knotting means, means for severing the knotted cord from the cord supply, and means for removing the cord from the knotting means.

5. In a machine of the class described, a support, a table carrying arm, extended from the support, a work table on the arm, means for gripping a cord at one end and at a point spaced from the end, means for knotting the cord adjacent the held position to form an article loop, means for severing the loop from the cord supply, and means for removing the knotted loop from the knotting means.

6. In a machine of the class described, a support, a table carrying arm extended from the support, a work table on the arm, a cord gripping means, an operating shaft for the cord gripping means, a movable carriage, means on the carriage intermittently engageable with the operating shaft, a knotting mechanism, means for operating said knotting mechanism and means for subsequently cutting the cord between the knot and the source of cord supply.

7. In a machine of the class described, a support, a table carrying arm extended from the support, a table on the arm, a cord gripping means, a cord knotting means, an operating shaft for the cord knotting means, a movable carriage, means on the carriage intermittently engageable with said operating shaft, and means for subsequently cutting the cord between the knot and the source or cord supply.

8. In a machine of the class described, a support, a table carrying arm extended from the support, a work table on the arm, a cord gripping means, an operating shaft for the cord gripping means, a cord knotting means, an operating shaft for the cord knotting means, a movable carriage, means on the carriage intermittently engageable with said operating shafts for actuating the cord gripping means and the cord knotting means, and means for subsequently cutting the cord between the knot and the source of cord supply.

9. In a mechanism of the class described, a cord carrying member comprising a bar and a curved spring plate secured at one end of the bar, its other end being in frictional engagement therewith.

10. In a mechanism of the class described, a cord carrying member comprising a bar, a curved spring plate secured at one end to the bar, its other end being in engagement therewith, and a pair of laterally extended pins projecting from the bar and through the plate, a cord being adapted to be disposed between said pins and the bar and plate.

11. In a machine of the class described, a support, a table carried by said support, means for disposing a cord around an article upon the table, a tying mechanism, means for simultaneously operating the cord disposing means and the tying mechanism, a lever for actuating said operating means, said lever being normally connected to the operating means and adapted to be automatically released therefrom at a predetermined point.

12. In a machine of the class described, a support, a table carried by said support, means for disposing the cord around an article upon the table, a tying mechanism, a lever for simultaneously operating the cord disposing means and the tying mechanism, and an actuating lever normally connected to said operating lever and adapted to be automatically disengaged therefrom at a predetermined point.

13. In a machine of the class described, a support, a table carried by said support, a needle for disposing a cord about an article upon the table, a tying mechanism and a lever for simultaneously operating said needle and tying mechanism, said lever being in cam engagement with the needle.

14. In a machine of the class described, a support, a table carried by said support, a needle for disposing a cord about an article upon the table, a tying mechanism, a lever for simultaneously operating said needle and tying mechanism, said lever being in cam engagement with the needle, and an actuating lever normally connected to said operating lever and adapted to be automatically released at a predetermined point.

In testimony that I claim the foregoing I have hereunto set my hand at Milwaukee, in the county of Milwaukee and State of Wisconsin.

FRANK RADECHOVSKY.